(12) United States Patent
Brosowski et al.

(10) Patent No.: US 11,052,868 B2
(45) Date of Patent: Jul. 6, 2021

(54) SEAT BELT RETRACTOR

(71) Applicant: AUTOLIV DEVELOPMENT AB, Vargarda (SE)

(72) Inventors: Tjark Brosowski, Hamburg (DE); Markus Hueg, Hamburg (DE); Aniruddha Deshpande, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 135 days.

(21) Appl. No.: 16/468,014

(22) PCT Filed: Nov. 23, 2017

(86) PCT No.: PCT/EP2017/080159
§ 371 (c)(1),
(2) Date: Jun. 10, 2019

(87) PCT Pub. No.: WO2018/108474
PCT Pub. Date: Jun. 21, 2018

(65) Prior Publication Data
US 2020/0148163 A1 May 14, 2020

(30) Foreign Application Priority Data
Dec. 14, 2016 (DE) ..................... 10 2016 224 952.5

(51) Int. Cl.
*B60R 22/40* (2006.01)
*B60R 22/415* (2006.01)

(52) U.S. Cl.
CPC ............ *B60R 22/40* (2013.01); *B60R 22/415* (2013.01)

(58) Field of Classification Search
CPC ........ B60R 22/40; B60R 22/41; B60R 22/415
See application file for complete search history.

(56) References Cited

U.S. PATENT DOCUMENTS 5,348,248 A 9/1994 Butenop
5,904,371 A 5/1999 Koning
(Continued)

FOREIGN PATENT DOCUMENTS

DE 39 13 631 A1 10/1990
DE 102 20 043 C1 10/2003
(Continued)

OTHER PUBLICATIONS

International Search Report of PCT/EP2017/080159 dated Feb. 16, 2018.

*Primary Examiner* — Sang K Kim
(74) *Attorney, Agent, or Firm* — Dickinson Wright PLLC

(57) ABSTRACT

A seat belt retractor with a belt shaft rotatably supported in a frame for winding up a seat belt. A blocking device blocks the belt shaft in the winding off direction. A control disk (1) is spring-loaded in the direction of winding up and with a cogging (2). A sensor device (3) inertia mass (4) and a blocking lever (5) can be deflected by the inertia mass (4), which blocks the control disk (1) by deflecting the inertia mass (4) and an engagement of the blocking lever (5) into the cogging (2) of the control disk (1). A counter gear unit (6) driven by the rotary movement of the belt shaft, and a first switching device (7) is activated by the counter gear unit (6) and blocks the control disk (1) after a first belt webbing withdrawal (A) and frees it again after a second belt webbing intake (B). A second switching device (8) is activated by the counter gear unit (6) and fixes the blocking lever (5) after a belt webbing intake (C) in a non-engagement position into the cogging (2) of the control disk (1).

9 Claims, 2 Drawing Sheets

(56) References Cited

U.S. PATENT DOCUMENTS

| | | | |
|---|---|---|---|
| 7,384,014 B2 * | 6/2008 | Ver Hoven | B60R 22/415 |
| | | | 242/382.2 |
| 8,579,223 B2 | 11/2013 | Aranda | |
| 2005/0133652 A1 | 6/2005 | Kielwein | |

FOREIGN PATENT DOCUMENTS

| | | |
|---|---|---|
| DE | 103 60 032 A1 | 3/2006 |
| DE | 698 34 433 T2 | 4/2007 |
| WO | WO 2008/064870 A1 | 6/2008 |

* cited by examiner

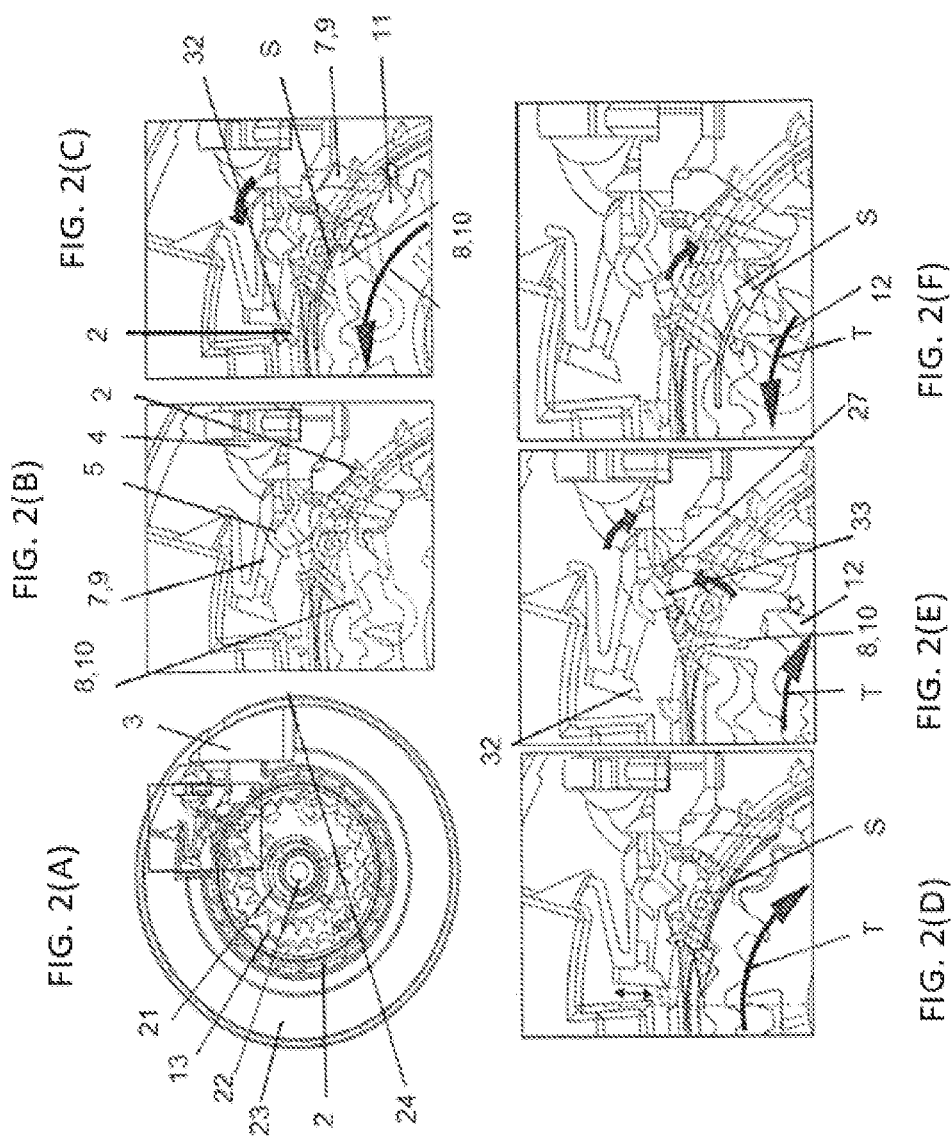

SEAT BELT RETRACTOR

CROSS-REFERENCE TO RELATED APPLICATIONS

This application is a 35 U.S.C. § 371 national phase of PCT International Application No. PCT/EP2017/080159, filed Nov. 23, 2017, which claims the benefit of priority under 35 U.S.C. § 119 to German Patent Application No. 10 2016 224 952.5, filed Dec. 14, 2016, the contents of which are incorporated herein by reference in their entirety.

FIELD OF THE INVENTION

The present invention relates to a seat belt retractor for a motor vehicle.

BACKGROUND

In principle, seat belt retractors in vehicles are used to wind up a seat belt of a seat belt device of a vehicle. For this purpose, the seat belt retractor has a belt shaft, which is spring-loaded in the direction of winding up and is rotatably supported in a frame fastened fixedly on the vehicle. Moreover, the seat belt retractor has a blocking device for blocking the belt shaft in the belt winding off (extraction) direction, which is activated by use of suitable sensor devices each having a movable inertia mass upon exceeding predetermined limiting values of the vehicle delay or the belt webbing withdrawal acceleration. The belt shaft is accordingly rotatable against the spring loading in the winding off direction below the limiting values of the vehicle delay and the belt webbing withdrawal acceleration and is automatically driven by the spring loading in the direction of winding up upon the unfastening of the seat belt. The sensor device detecting the vehicle delay includes a deflectable inertia mass and a blocking lever resting thereon, which is in turn deflected upon a deflection of the inertia mass and engages in an outer cogging of a control disk rotatably supported on the belt shaft to control the blocking device.

The buckling in of a child seat on the vehicle seat represents a special situation. In this case, the belt shaft is always to be blocked in the withdrawal direction after fixing of the child seat on the vehicle seat independently of exceeding the predetermined limiting values of the vehicle delay or belt webbing withdrawal acceleration. For this purpose, the belt webbing is withdrawn nearly entirely and, at a predetermined first belt webbing withdrawal length, switched over from the ELR mode (Emergency Locking Retractor) into the ALR mode (Automatic Locking Retractor). In the ALR mode, the belt shaft can exclusively rotate in the intake direction, so that the seat belt can be taken in by rotating the belt shaft in the direction of winding up until the seat belt is wrapped around the child seat without a belt slack, and the belt shaft is subsequently blocked in the withdrawal direction independently of the acting accelerations of the vehicle delay and the belt webbing withdrawal. This is achieved by the control disk being blocked by use of a blocking lever with respect to a housing cap in the withdrawal direction, so that the blocking device is automatically controlled in the event of a belt webbing withdrawal, and the belt shaft is thus blocked in the withdrawal direction. The described circuit is also referred to as KiSi in the company of the applicant.

Such a seat belt retractor is known, for example, from DE 102 20 043 C1. To switch over the seat belt retractor from the ELR mode to the ALR mode, the seat belt retractor has a counter gear unit, which includes a wobble plate, which is driven via an eccentric drive and rolls with outer cogging off a fixed inner cogging of a house cap of the seat belt retractor. Furthermore, a switching lever pivotably supported on a bearing point of the house cap is provided, which is forced into a pivot movement by a switching cam upon reaching the predetermined belt webbing withdrawal length and thus forces the blocking lever of the sensor device detecting the vehicle delay into the cogging of the control disk and controls the blocking device independently of the vehicle delay. The belt shaft is thus permanently blocked in the belt webbing withdrawal direction independently of the acting vehicle delay or belt webbing withdrawal acceleration and the child seat is fixed on the vehicle seat. To switch over the seat belt retractor from the ALR mode back into the ELR mode, a second switching cam is provided, which is positioned so that the switching lever is pivoted back upon reaching a second belt webbing intake length, and the control disk is thus released again. The device for switching over the seat belt retractor from the ELR mode to the ALR mode is referred to hereafter in the further description as the first switching device.

A further problem is a seat-integrated arrangement of seat belt retractors in adjustable-inclination (reclining) backrests, in which the blocking device would be inadvertently activated in the event of an inclination adjustment of the backrest because of the deflection of the inertia mass, so that subsequently the belt shaft would be blocked in the withdrawal direction by the activation thus caused of the blocking device, and a further adjustment of the backrest would no longer be possible due to the blocked belt shaft and the belt webbing withdrawal thus blocked. To avoid this problem, the activation of the blocking device has to be intentionally deactivated by the vehicle-sensitive sensor device in the position of the unapplied seat belt, so that the inclination of the backrest can be adjusted and in particular the backrest can be pivoted forward for the entry of the occupants to the rear seats. Such a switching off of the vehicle-sensitive sensor device is also referred to in the company of the applicant as a "lock canceler" with the abbreviation "LC".

To solve this problem, it is known from DE 102 20 043 C1 to provide a switching ring driven by the counter gear unit with a switching cam, which fixes the blocking lever of the vehicle-sensitive sensor device upon the winding up of the seat belt from a predetermined belt webbing intake length in a non-engagement position, so that it can no longer enter the cogging of the control disk and the vehicle-sensitive sensor device is thus switched off. The above-described device for switching off the vehicle-sensitive sensor device is referred to hereafter in the further description as a second switching device.

The counter gear unit in DE 102 20 043 C1 is accordingly used both to control the movement of the switching lever to switch over from the ELR mode to the ALR mode and also to secure the blocking lever of the vehicle-sensitive sensor device at the predetermined belt webbing intake length, wherein the switching points are designed independently of one another by the individual arrangement of the switching cams on the wobble plate or on the switching disk and also by the individual alignment of the wobble plate and the switching disk in relation to the belt shaft and the sensor device or the switching lever, respectively. In this case, it is necessary in particular to switch over the seat belt retractor after the switching over into the ALR mode during the subsequent further intake movement from a predetermined second belt webbing intake length back into the ELR mode, i.e., to intentionally release the control disk again, since the belt shaft is intentionally not to be blocked when the belt webbing is completely taken in for the above-described reasons. The switching over from the ELR mode to the ALR mode and back again thus requires two separate switching points, namely the switching over into the ALR mode to secure the child seat in the first belt webbing withdrawal length and the switching back into the ELR mode in the second belt webbing intake length before the complete winding up of the seat belt. Furthermore, a third switching point is required in which the blocking lever of the vehicle-sensitive sensor device is fixed in the non-engagement position to enable the inclination adjustment of the backrest. This third switching point is designed at a belt webbing intake length which is less than the second belt webbing intake length of the second switching point of the ELR-ALR switchover, since the switching off of the vehicle-sensitive sensor device is first reasonable when the control disk and thus the belt shaft can rotate freely in the withdrawal direction.

Against this background, the invention is based on an object of providing a seat belt retractor with a first switching device for switching over from an ELR mode to an ALR mode and a second switching device for deactivating the vehicle-sensitive sensor device from a predetermined belt webbing intake length having a simplified design construction and an improved belt webbing withdrawal characteristic and belt webbing intake characteristic.

To achieve the above-described object, a seat belt retractor having the features described here is proposed.

SUMMARY

According to a feature of the invention, it is proposed that both the first switching device and also the second switching device are activated during the belt webbing intake movement in the second, predetermined belt webbing intake length. The previously provided third switching point can be saved by way of the proposed solution. The belt shaft is thus, in the switching point of the second predetermined belt webbing intake length, not only released again in the rotational direction in the withdrawal direction, as is effectuated by the first switching device upon the switching over from the ALR mode to the ELR mode, the vehicle-sensitive sensor device is additionally deactivated by the switching of the second switching device, so that the belt shaft is moreover no longer blocked during an adjustment of the inclination of the backrest. Since both switching devices are switched simultaneously, the previously provided intermediate phase, which is not required, is dispensed with, between the switching over of the seat belt retractor from the ALR mode to the ELR mode and the switching off of the vehicle-sensitive sensor device, in which the belt shaft can rotate freely in the withdrawal direction, but can inadvertently be blocked in the event of a deflection of the inertia mass and engagement of the first blocking lever in the cogging of the control disk. This blocking of the belt shaft can result in undesired problems of the handling, which are moreover annoying since blocking of the belt shaft in this phase of the belt webbing withdrawal is not useful, since the seat belt cannot have any restraint function for a child seat or for a buckled-in person because of the short withdrawal length. The switching of the two switching devices and the withdrawal behavior of the belt webbing can thus be simplified and improved. Furthermore, an undesired and moreover also useless blocking of the belt shaft in the intermediate phase between the two switching points separate from one another can thus be avoided.

A coupling of the two switching devices having a particularly simple design can be implemented in this case in that the first switching device activates the second switching device or vice versa in the second, predetermined belt webbing intake length. Only one of the two switching devices is thus activated by the counter gear unit, while the other switching device is automatically also activated. The switching over from the ALR mode to the ELR mode thus always takes place in coupling with the switching off of the vehicle-sensitive sensor device.

According to a further preferred embodiment of the present invention, it is proposed that the first switching device is formed by a first, pivotable switching lever and the second switching device is formed by a second, pivotable switching lever, which can preferably rest on one another. The required switching movements can thus be implemented particularly simply, and the two switching devices can be coupled to one another particularly simply.

In this case, the second switching lever can preferably be provided having a curved contacting section for contacting the blocking lever which makes possible a fixing of the blocking lever in different angle of rotation positions of the sensor device. As a result of the specifications of the vehicle producer, the seat belt retractor has to be fastened in a predetermined angle position on the vehicle because of the individual fastening point and its alignment. Since the sensor device in turn has to be arranged in a predetermined alignment in relation to the vehicle longitudinal axis and the vehicle transverse axis for its functionality, which alignment is independent of the installation location of the seat belt retractor, the angle of rotation position of the sensor device in the seat belt retractor has to be individually adapted to compensate for the individual installation location of the seat belt retractor. In order that the blocking lever can thus also be fixed in different angle of rotation positions of the sensor devices by the second switching lever in the non-engagement position, the second switching lever includes a curved contacting section which enables a contact of the second switching lever on the blocking lever also in different angle of rotation positions of the sensor device and the blocking lever.

Furthermore, it is proposed that the counter gear unit includes a first switching cam and a second switching cam wherein the first switching device is switched in the first belt webbing withdrawal length by the first switching cam and the second switching device is switched together with the first switching device in the second belt webbing intake length by the second switching cam.

A particularly compact and functionally-reliable embodiment can be implemented in that the counter gear unit is formed by a wobble plate which rolls off a cogging fixed to a frame.

Furthermore, it is proposed that a contour is provided on the wobble plate which limits the deflection of the second switching lever of the second switching device during the rotary movement of the belt shaft up to the second belt webbing intake length so far that the blocking lever cannot enter into the cogging of the control disk. The proposed solution makes it possible to prevent the second switching device from unintentionally fixing the blocking lever in the non-engagement position by inadvertent deflection in the event of acting lateral accelerations.

In this case, the contour can preferably be formed by a cogging, and the second switching lever has a cogged shape at least in one section, which shape compensates the wobbling movement of the wobble plate and is adapted to the contour of the cogging. Due to the proposed shape of the contour and the shape of the second switching lever, the second switching lever finds a continuous buttress on the wobble plate even during the wobbling movement of the wobble plate, on which it can be supported during acting lateral accelerations, so that it is not inadvertently deflected even during the wobbling movement of the wobble plate and thus cannot fix the blocking lever in the non-engagement position.

BRIEF DESCRIPTION OF THE DRAWINGS

The invention will be explained hereafter on the basis of preferred embodiments with reference to the appended figures.

FIG. 2(A) shows the housing cap with the sensor device, and FIGS. 2(B) through 2(F) show the two switching devices in various positions during the belt webbing withdrawal movement and the belt webbing intake movement.

DETAILED DESCRIPTION

Figure 1:
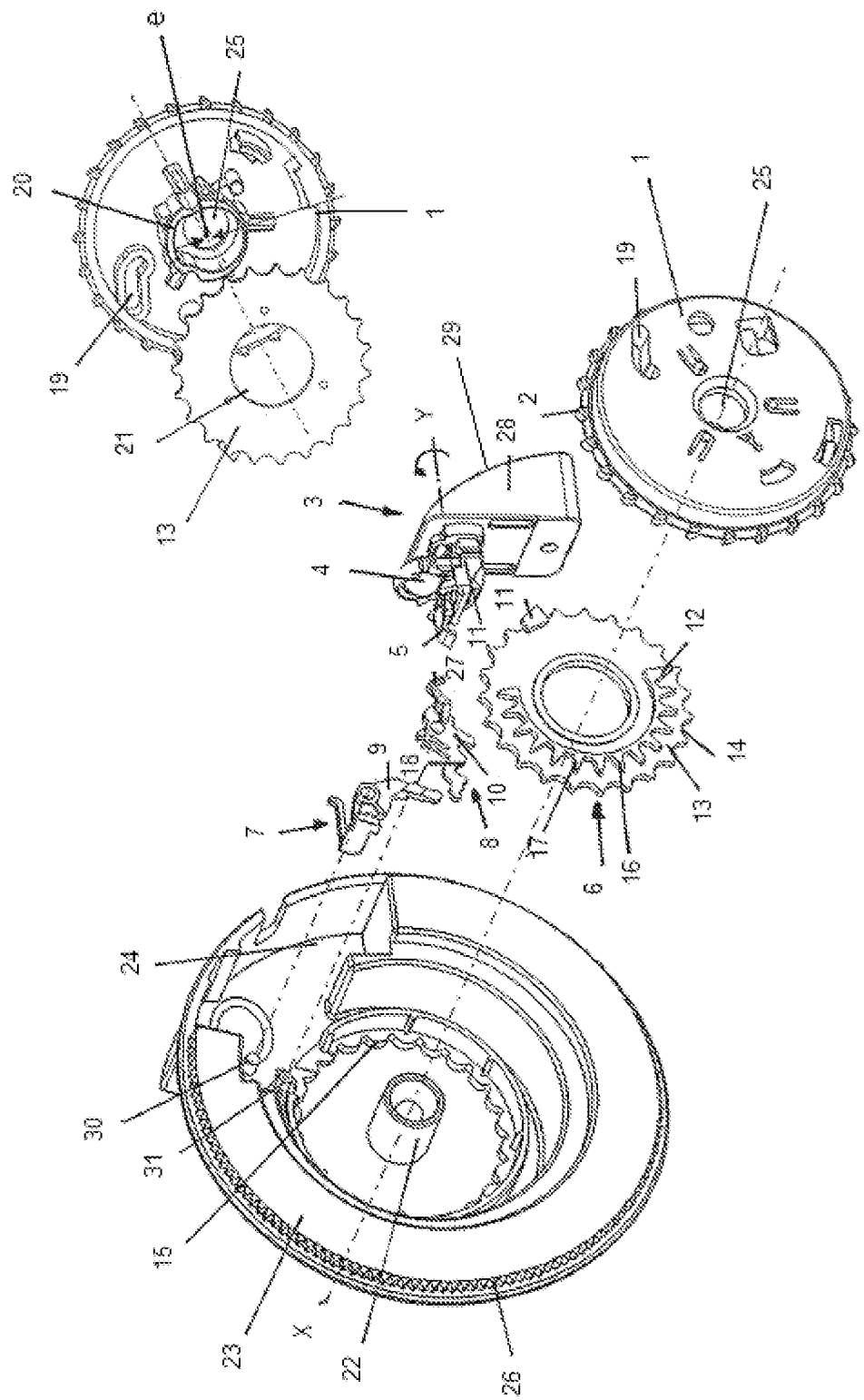
FIG. 1 shows a housing cap having a sensor device, a control disk, a counter gear unit, and two switching devices in an exploded view.

The individual parts to the exemplary embodiments of the invention can be seen in an exploded view in FIG. 1. In particular, a housing cap 23, which can be fastened on a frame (not shown) of a seat belt retractor, can be seen in FIG. 1. The housing cap 23 forms a cogging 26, on which the housing cap 23 can be fastened in different angle of rotation positions in relation to an X axis on the frame. Furthermore, a receptacle 24, in which a sensor device 3 detecting the vehicle delay can be accommodated, is provided in the housing cap 23. Moreover, a belt shaft (not shown) rotatably supported in the frame is provided, on which a seat belt of a seat belt device can be wound up. Furthermore, a control disk 1, which is spring-loaded in the direction of winding up in relation to the belt shaft, with a cogging 2 and a control post 19 is rotatably supported on the belt shaft. A blocking pawl (also not shown), which engages with a guide pin in the control post 19, is supported on the belt shaft (not shown). The blocking pawl here forms a blocking device, which, upon an operation explained in greater detail hereafter, by stopping the control disk 1 in relation to the belt shaft, executes an introduction movement defined by the shape of the control post 19 into a frame-fixed cogging of the seat belt retractor and thus blocks the belt shaft against a further belt webbing withdrawal movement. Furthermore, a counter gear unit 6 in the form of a wobble plate 13 is provided, the functionality of which will also be described hereafter.

The control disk 1 is rotatably supported with a bearing opening 25 on a bearing attachment (not shown) of a profile head of the belt shaft and itself has a bearing attachment 20 arranged eccentrically in relation to the bearing opening 25, on which the wobble plate 13 is in turn rotatably supported with a bearing opening 21. The eccentric offset of the bearing opening 25 in relation to the bearing attachment 20 and the eccentric support of the wobble plate 13 thus caused is identified in the figure with "e".

The sensor device 3 includes a main body 28 and a sensor housing 29 which can be fastened in different angle of rotation positions around a Y axis in the main body 28. An inertia mass 4 is movably supported on a support surface, on which a pivot-movable blocking lever 5 rests, in the sensor housing 29. According to its intended function, the inertia mass 4 is deflected upon exceeding a legally defined limiting value of the vehicle delay and thus pivots the blocking lever 5 so far that it enters the cogging 2 of the control disk 1 and stops it in relation to the belt shaft, whereby in turn the blocking pawl is extended into the frame-fixed cogging and the belt shaft is blocked in the withdrawal direction. In this case, the individual fastening alignment of the seat belt retractor on the vehicle structure can be compensated by a corresponding individual fastening of the housing cap 23 in a specific angle of rotation position around the X axis and by an individual arrangement of the sensor housing 29 in a specific angle of rotation position around the Y axis so far that the sensor housing 29 with the inertia mass 4 resting on the support is aligned in a predetermined alignment in relation to the vehicle longitudinal axis and the vehicle transverse axis to implement the predetermined response thresholds.

Furthermore, two bearing pins 30 and 31 are provided on the housing cap 23, on which a first switching lever 9 and a second switching lever 10 are pivotably supported, the function of which will be described hereafter. Furthermore, the housing cap 23 forms a cogging 15 and the wobble plate 13 forms a corresponding outer cogging 14. Furthermore, two protruding switching cams 11 and 12 and a laterally protruding contour 16 in the form of a regular, semicircular, outwardly oriented cogging 17 are provided on the side of the wobble plate 13 facing toward the control disk 1.

In the top left illustration of FIG. 2(A), the housing cap 23 is shown with the wobble plate 13 arranged therein, the sensor device 3, and the indicated cogging 2 of the control disk 1, which is not visible. In further FIGS. 2(B) through 2(F), the sensor device 3 can be seen with a detail of the counter gear unit 6 and the two switching levers 9 and 10 in various positions during the belt webbing withdrawal and during the following belt webbing intake. The two switching levers 9 and 10 form a first switching device 7 and a second switching device 8 here, which, as explained hereafter, fix or intentionally release the control disk 1 and the blocking lever 5 in predetermined regions of the belt webbing withdrawal length.

In the illustration of FIG. 1, the control disk 1 with the indicated cogging 2 is freely rotatable and can thus execute the rotational movements with the belt shaft. The blocking lever 5 is disengaged from the cogging 2 and is freely pivotable around its bearing point. If the vehicle delay exceeds a predetermined limiting value, the inertia mass 4 is thus deflected and the blocking lever 5 enters into the cogging 2 to activate the blocking device. This is the normal sequence when the occupant is buckled in with the seat belt. This state is also referred to as the ELR mode. To switch over the seat belt retractor into the ALR mode as shown in FIG. 2(C), the seat belt is withdrawn nearly completely, beyond a first predetermined belt webbing withdrawal length A, which is dimensioned so that it is not reached during the normal buckling in. It is thus ensured that the seat belt retractor is not switched over into the ALR mode during the normal buckling in even by very tall or very large persons or persons having very thick clothing. To switch over the seat belt retractor into the ALR mode, a first switching cam 11 protruding radially outward and laterally in the form of a ramp rising in the rotational direction of the control disk 1 in the belt webbing withdrawal direction is provided on the wobble plate 13. The rotational direction of the belt shaft and thus also of the control disk 1 during the belt webbing withdrawal is identified in FIG. 2(C) with the arrow S. Because of the described eccentric support of the wobble plate 13, in this case it executes an opposing rotational movement in the arrow direction T forced by the rolling off of the outer cogging 14 of the wobble plate 13 on the cogging 15 of the housing cap 23. In this case, the eccentricity "e" and the outer cogging 14 of the wobble plate 13 and the cogging 15 of the housing cap 23 can be designed, for example, so that the wobble plate 13 is pivoted by the angle of rotation of one tooth interval in relation to the housing cap 23 during each revolution of the belt shaft. The first switching cam 11 is arranged in such a way that it comes into contact at the predetermined first belt webbing withdrawal length A at the one end of the first switching lever 9. During the further rotational movement of the belt shaft in the withdrawal direction and the rotational movement of the wobble plate 13 thus forced, the first switching lever 9 is forced into a pivot movement because of the ramp shape of the first switching cam 11, whereby the first switching lever 9 engages with its tip 32 with the cogging 2 of the control disk 1 and thus blocks the control disk 1 against a further rotational movement in the withdrawal direction. The belt shaft is thus always blocked in the withdrawal direction independently of the acting vehicle delay and is thus in the ALR mode.

After the switching over into the ALR mode, which is also acoustically perceptible by a soft clicking, the belt shaft can rotate together with the control disk 1 exclusively in the intake direction, wherein the first switching lever 9 ratchets with its tip 32 over the cogging 2, which is again also perceptible due to a soft ratcheting. The belt webbing is now introduced by the handling person until the child seat is buckled in solidly on the vehicle seat. This movement sequence is illustrated in FIG. 2(D)

To switch the seat belt retractor back into the ELR mode, the belt shaft is rotated together with the control disk 1 further in the intake direction of the belt webbing until the second switching cam 12 comes into contact on the second switching lever 10 in the second predetermined belt webbing intake length B. This position can be seen in FIG. 2(E). The second switching lever 10 is then pivoted during the further belt webbing intake movement and thus comes into contact with a curved contacting section 27 on the lower side of the blocking lever 5, so that the blocking lever 5 is subsequently fixed in the non-engagement position, and the control disk 1 can no longer be blocked independently of the acting vehicle delay. At the same time, the second switching lever 10 comes into contact on a projection 33 of the first switching lever 9, whereby the first switching lever 9 is also pivoted by the second switching lever 10 and the tip thereof disengages from the cogging 2 of the control disk 1. The seat belt retractor is thus subsequently switched by the first switching device 7 into the ELR mode, although the blocking lever 5 is fixed by the second switching device 8, formed by the second switching lever 10, in the non-engagement position. The vehicle-sensitive sensor device 3 is thus switched off and the belt webbing can be withdrawn to adjust the backrest or to fold over the backrest, without the belt shaft being able to be blocked. The first and the second switching devices 7 and 8 are accordingly simultaneously switched upon reaching the second predetermined belt webbing intake length B, which is solved with a particularly simple design here in that the second switching lever 10 comes into contact on the first switching lever 9. Both switching procedures are triggered solely by the contact of the second switching cam 12 on the second switching lever 10. The deactivation of the sensor device 3 and the switching over from the ALR mode into the ELR mode take place practically simultaneously.

The position of FIG. 2(E) is maintained when the seat belt is not applied. If the seat belt is now withdrawn for a further buckling in procedure, the belt shaft is thus rotated together with the control disk 1 in the arrow direction S and the wobble plate 13 is rotated in the arrow direction T, as can be seen in FIG. (2F). During this rotational movement, the second switching cam 12 again comes into contact on the second switching lever 10 and subsequently forces the second switching lever 10 into a pivot movement oriented in reverse, while the curved section 27 of the second switching lever 10 is pivoted away from the blocking lever 5 and thus releases the blocking lever 5. The two switching levers 9 and 10 and/or the first switching device 7 and the second switching device 8 thus again assume the position shown in FIG. 2(A).

In order that the second switching lever 10 is not inadvertently deflected by acting lateral accelerations during the following belt webbing withdrawal movement and/or during the normal use of the seat belt and the sensor device 3 is thus inadvertently deactivated, a laterally protruding contour 16 in the form of a semicircular, outwardly oriented cogging 17 is provided on the wobble plate 13, which is guided during the wobble movement of the wobble plate 13 by a cogged section 18 of the second switching lever 10. The contour 16 thus forms a buttress, on which the second switching lever 10 is supported in every phase of the rotational movement. The teeth of the cogging 17 of the contour 16 preferably have an identical angle interval as the teeth of the outer cogging 14 of the wobble plate 13. Furthermore, the section 18 on the second switching lever 10 has a corresponding shape, so that the teeth of the cogging 17 can plunge therein during the wobbling movement without moving the second switching lever 10.

Furthermore, the curved contacting section 27 of the second switching lever 10 is shaped so that the curvature center point of the contacting section 27 is approximately located in the Y axis in the position resting on the blocking lever 5. The function of the sensor switching off can thus be enabled for different angle of rotation positions of the sensor housing 29 around the Y axis in relation to the main body 28, without the second switching lever 10 having to be adapted for this purpose.

While the above description constitutes the preferred embodiment of the present invention, it will be appreciated that the invention is susceptible to modification, variation and change without departing from the proper scope and fair meaning of the accompanying claims.

The invention claimed is:
1. A seat belt retractor, comprising
a belt shaft rotatably supported in a frame for winding up a seat belt, and
a blocking device for blocking the belt shaft in a winding off direction, and
a control disk rotatably supported on the belt shaft, spring-loaded in a of winding up direction and with a cogging, and
a sensor device with a deflectable inertia mass and a blocking lever which can be deflected by deflecting the inertia mass, which blocks the control disk upon an exceeding of a predetermined vehicle delay by deflecting the inertia mass and with an engagement of the blocking lever brought about as a result into the cogging of the control disk opposite the belt shaft in a direction of withdrawing the belt and as a consequence controls the blocking device, and
a counter gear unit driven by a rotary movement of the belt shaft, and
a first switching device which is activated by the counter gear unit and which blocks the control disk after a first predetermined belt webbing withdrawal length in the direction of the belt withdrawal and frees the control disc again after a second predetermined belt webbing intake length, and a second switching device which is activated by the counter gear unit and which fixes the blocking lever after a predetermined belt webbing intake length in a non-engagement position into the cogging of the control disk, the first switching device as well as the second switching device are activated during the belt webbing intake movement in the second predetermined belt webbing intake length.

2. A seat belt retractor according to claim 1 further comprising, the first switching device activates the second switching device or vice versa in the second predetermined belt webbing intake length.

3. A seat belt retractor according to claim 1 further comprising, the first switching device is formed by a first pivotable switching lever and the second switching device is formed by a second pivotable switching lever.

4. A seat belt retractor according to claim claim 3 wherein the second switching lever rests on the first switching lever.

5. A seat belt retractor according to claim 3 wherein the second switching lever comprises a curved contacting section for contacting the blocking lever which makes possible a fixing of the blocking lever in different angle of rotation positions of the sensor device.

6. A seat belt retractor according to claim 3 further comprising, a contour is provided on the wobble plate which limits the deflection of the second switching lever of the second switching device during the rotary movement of the belt shaft up to the second belt webbing intake length so far that the blocking lever cannot enter into the cogging of the control disk.

7. A seat belt retractor according to claim 6 further comprising, the contour is formed by a cogging and that the second switching lever has a cogged shape at least in a section, which shape compensates the wobbling movement of the wobble plate and is adapted to the contour of the cogging.

8. A seat belt retractor according to claim 1 further comprising wherein the counter gear unit comprises a first switching cam and a second switching cam wherein the first switching device is switched in the first belt webbing withdrawal length by the first switching cam and the second switching device is switched together with the first switching device in the second belt webbing intake length by the second switching cam.

9. A seat belt retractor according to claim 1 further comprising, that the counter gear unit is formed by a wobble plate which rolls off a cogging fixed to the frame.

* * * * *